United States Patent
Rajput et al.

(10) Patent No.: US 12,363,075 B2
(45) Date of Patent: Jul. 15, 2025

(54) METHODS, SYSTEMS, AND COMPUTER READABLE MEDIA FOR AUTOMATICALLY UPDATING FIREWALL RULES TO FILTER SERVICE-BASED INTERFACE (SBI) MESSAGES RELATING TO NEW OR UPDATED SERVICES

(71) Applicant: Oracle International Corporation, Redwood Shores, CA (US)

(72) Inventors: Jay Rajput, Bangalore (IN); John Nirmal Mohan Raj, Bangalore (IN); Ashish Jyoti Sharma, New Delhi (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 219 days.

(21) Appl. No.: 18/236,921

(22) Filed: Aug. 22, 2023

(65) Prior Publication Data
US 2025/0071094 A1     Feb. 27, 2025

(51) Int. Cl.
*H04L 9/40*         (2022.01)

(52) U.S. Cl.
CPC ...... *H04L 63/0263* (2013.01); *H04L 63/0281* (2013.01)

(58) Field of Classification Search
CPC .................. H04L 63/0263; H04L 63/0281
See application file for complete search history.

(56) References Cited

U.S. PATENT DOCUMENTS

| 9,667,596 B2 * | 5/2017 | Halabi ............... H04L 63/0263 |
| 9,705,909 B2 * | 7/2017 | Zaw ................... H04L 63/0263 |

(Continued)

FOREIGN PATENT DOCUMENTS

| CN | ZL202280032824.X | 4/2025 |
| EP | 3886502 A1 | 9/2021 |

(Continued)

OTHER PUBLICATIONS

Bringhenti, Daniele, et al. "Automated firewall configuration in virtual networks." IEEE Transactions on Dependable and Secure Computing 20.2: 1559-1576. (Year: 2022).*

(Continued)

*Primary Examiner* — John M Macilwinen
(74) *Attorney, Agent, or Firm* — Jenkins, Taylor & Hunt, P.A.

(57) ABSTRACT

A method for automatically generating and distributing firewall rules to filter service-based interface (SBI) messages relating to new or updated services includes maintaining a repository of firewall rules for updating a ruleset used by a core network firewall to filter SBI messages transmitted in a core network. The method further includes automatically retrieving, from an online archive of Third Generation Partnership Project (3GPP) standards documents, definitions of service operations performed on SBI interfaces in the core network. The method further includes automatically generating firewall rules based on the definitions of the service operations. The method further includes storing the firewall rules in the repository of firewall rules. The method further includes automatically distributing the firewall rules in the repository of firewall rules to the core network firewall.

20 Claims, 6 Drawing Sheets

(56) References Cited

U.S. PATENT DOCUMENTS

| | | | |
|---|---|---|---|
| 10,277,465 | B2 | 4/2019 | Tock et al. |
| 10,484,334 | B1 | 11/2019 | Lee et al. |
| 10,531,305 | B1* | 1/2020 | Verma .................. H04W 12/08 |
| 10,594,734 | B1 | 3/2020 | Rappard et al. |
| 10,601,776 | B1 | 3/2020 | Burakovsky et al. |
| 11,843,580 | B2 | 12/2023 | Rajput et al. |
| 12,231,507 | B2* | 2/2025 | Li .......................... H04L 67/63 |
| 2008/0235507 | A1 | 9/2008 | Ishikawa et al. |
| 2012/0204251 | A1 | 8/2012 | Kopti |
| 2014/0245423 | A1* | 8/2014 | Lee ........................ H04L 63/20 |
| | | | 726/12 |
| 2019/0230556 | A1 | 7/2019 | Lee |
| 2020/0162429 | A1 | 5/2020 | Burakovsky et al. |
| 2020/0162514 | A1 | 5/2020 | Rappard et al. |
| 2020/0314672 | A1 | 10/2020 | Farooq |
| 2021/0288942 | A1 | 9/2021 | Preda et al. |
| 2022/0015023 | A1 | 1/2022 | De-Gregorio-Rodriguez et al. |
| 2022/0124162 | A1 | 4/2022 | Zhang |
| 2022/0247792 | A1 | 8/2022 | Verma et al. |
| 2022/0360561 | A1* | 11/2022 | Rajput ................ H04L 63/0227 |
| 2023/0179573 | A1* | 6/2023 | Sosnovich .............. H04L 41/22 |
| | | | 726/1 |
| 2024/0057033 | A1 | 2/2024 | Goel |
| 2024/0073103 | A1 | 2/2024 | Arends et al. |
| 2024/0080300 | A1 | 3/2024 | Rajput et al. |

FOREIGN PATENT DOCUMENTS

| | | |
|---|---|---|
| KR | 20190088878 A | 7/2019 |
| WO | WO-2020/030275 A1 | 2/2020 |
| WO | WO-2021/047551 A1 | 3/2021 |
| WO | WO-2022/069089 A1 | 4/2022 |
| WO | WO-2022/235372 A1 | 11/2022 |
| WO | WO-2024/050010 A1 | 3/2024 |

OTHER PUBLICATIONS

Compastié, Maxime, et al. "Palantir: An nfv-based security-as-a-service approach for automating threat mitigation." Sensors 23.3: 1658. (Year: 2023).*

3GPP TSG-SA WG2 Meeting #128 Bis S2-187949 (Aug. 24, 2018).

Office Action for Chinese Patent Application Serial No. 202280032824.X (Sep. 1, 2024).

Non-Final Office Action for U.S. Appl. No. 17/984,267 (Sep. 26, 2024).

Intent to Grant for European Patent Application Serial No. 22723259.2 (Aug. 26, 2024).

Decision to Grant for European Patent Application Serial No. 22723259.2 (Jan. 7, 2025).

Non-Final Office Action for U.S. Appl. No. 17/902,531 (Dec. 17, 2024).

El-Atawy et al., "An Automated Framework for Validating Firewall Policy Enforcement," Eighth IEEE International Workshop on Policies for Distributed Systems and Networks Jun. 25, 2007.

Gomez et al, "Security policies definition and enforcement utilizing policy control function framework in 5G," Computer Communications 172 (2021) 226-237.

Salva-Garcia, P. et al., "Towards Automatic Deployment of Virtual Firewalls to Support Secure mMTC in 5G Networks," IEEE Infocom 2019—IEEE Conference on Computer Communications Workshops (Infocom Wkshps), pp. 385-390, 2019.

Wehbe, N., et al., "A Security Assessment of HTTP/2 Usage in 5G Service-Based Architecture," in IEEE Communications Magazine, vol. 61, No. 1, pp. 48-54, Jan. 2023.

Multiprotocol Signaling Firewall—Mobileum 2020.

Security Edge Protection Proxy (SEPP)—Mobileum 2020.

Security Edge Protection Proxy (SEPP)—Broadforward Jun. 6, 2023.

3rd Generation Partnership Project; Technical Specification Group Core Network and Terminals; 5G System; Network Function Repository Services; Stage 3 (Release 18) 3GPP TS 29.510 V18.3.0 (Jun. 2023).

"5G Interconnect Security," GSMA, Version 2.0, FS.36, pp. 1-61 (Jun. 3, 2021).

3rd Generation Partnership Project; Technical Specification Group Core Network and Terminals; 5G System; Technical Realization of Service Based architecture; Stage 3 (Release 18) 3GPP TS 29.500 V18.2.0 (Jun. 2023).

3rd Generation Partnership Project; Technical Specification Group Core Network and Terminals; 5G System; Principles and Guidelines for Services Definition; Stage 3 (Release 18) 3GPP TS 29.501 V18.2.0 (Jun. 2023).

3rd Generation Partnership Project; Technical Specification Group Services and System Aspects; Security Architecture and Procedures for the 5G System (Release 18) 3GPP TS 33.501 V18.2.0 (Jun. 2023).

YAML, https://en.wikipedia.org/wiki/YAML; last updated Jul. 31, 2023.

API Firewall—API Firewall (42crunch.com) 2023.

Notice of Allowance and Fee(s) Due for U.S. Appl. No. 17/308,018 (Aug. 2, 2023).

Alcala-Marin et al., "Global Mobile Network Aggregators: Taxonomy, Roaming Performance and Optimization," ACM, pp. 1-13 (2022).

"OAuth 2.0," Swagger, https://swagger.io/docs/specification/authentication/oauth2/, pp. 1-6 (2022).

Non-Final Office Action for U.S. Appl. No. 17/308,018 (Jan. 20, 2023).

Commonly-assigned, Co-pending U.S. Appl. No. 17/902,531 for "Methods, Systems, and Computer Readable Media for Automatic Category 1 Message Filtering Rules Configuration by Learning Topology Information from Network Function (NF) Repository Function (NRF)," (Unpublished, filed Sep. 2, 2022).

Notification of Transmittal of the International Search Report and the Written Opinion of the International Searching Authority, or the Declaration for International Application No. PCT/US2022/023812 (Jul. 22, 2022).

"3rd Generation Partnership Project; Technical Specification Group Core Network and Terminals; 5G System; Network Function Repository Services; Stage 3 (Release 17)," 3GPP TS 29.510, V17.6.0, pp. 1-306 (Jun. 2022).

"3rd Generation Partnership Project; Technical Specification Group Services and System Aspects; System architecture for the 5G System (5GS); Stage 2 (Release 17)," 3GPP TS 23.501, V17.5.0, pp. 1-568 (Jun. 2022).

"3rd Generation Partnership Project; Technical Specification Group Services and System Aspects; Procedures for the 5G System (5GS); Stage 2 (Release 17)," 3GPP TS 23.502, V17.4.0, pp. 1-738 (Mar. 2022).

"3rd Generation Partnership Project; Technical Specification Group Core Network and Terminals; 5G System; Public Land Mobile Network (PLMN) Interconnection; Stage 3 (Release 17)," 3GPP TS 29.573, V17.4.0, pp. 1-106 (Mar. 2022).

Commonly-assigned, Co-pending U.S. Appl. No. 17/308,018 for "Methods, Systems, and Computer Readable Media for Platform Firewall Management by Network Function (NF) Repository Function (NRF) or Service Communications Proxy (SCP)," (Unpublished, filed May 4, 2021).

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).

"Functionality to be Deployed i in Different Locations," Ericsson, https://www.ericsson.com/en/future-technologies/architecture/network-architecture-domains, pp. 1-20 (2021).

"3rd Generation Partnership Project; Technical Specification Group Services and System Aspects; Security Aspects; Study on security aspects of the 5G Service Based Architecture (SBA) (Release 16)," 3GPP TR 33.855, V16.1.0, pp. 1-103 (Sep. 2020).

Dredge, "The Service Communication Proxy: 5G Caught Up in a Service Mesh," Metaswitch, pp. 1-10 (Feb. 14, 2020).

(56) References Cited

OTHER PUBLICATIONS

Girondi, "Efficient Traffic Monitoring in 5G Core Network," KTH Royal Institute of Technology, pp. 1-118 (2020).
"Ultra Cloud Core 5G Policy Control Function, Release 2020.03—Configuration and Administration Guide," Cisco, https://www.cisco.com/c/en/us/td/docs/wireless/ucc/pcf/2020-03-0/b_ucc-5g-pcf-config-and-admin-guide_2020-03/m_5g-pcf-overview.html#id_121328, pp. 1-7 (Mar. 2020).
Salva-Garcia et al., "5G NB-Iot: Efficient Network Traffic Filtering for Multitenant IoT Cellular Network," Security and Communications Networks, vol. 2018, pp. 1-22 (2018).
"Making 5G a Reality," NEC Corporation, pp. 1-32 (2018).
International Search Report and Written Opinion for Appl No. PCT/US2023/031707 dated Dec. 14, 2023.
Notification to Grant for Chinese Patent Application Serial No. 202280032824.X (Mar. 4, 2025).

* cited by examiner

METHODS, SYSTEMS, AND COMPUTER READABLE MEDIA FOR AUTOMATICALLY UPDATING FIREWALL RULES TO FILTER SERVICE-BASED INTERFACE (SBI) MESSAGES RELATING TO NEW OR UPDATED SERVICES

TECHNICAL FIELD

The subject matter described herein relates to managing communications between 5G network functions (NFs). More particularly, the subject matter described herein relates to automatically generating and distributing firewall rules to update firewall rulesets used by core network firewalls to filter communications between 5G NFs.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that exists in 5G and other types of networks is updating firewall rules for service-based interface (SBI) transactions. The SBI is the interface used to access services provided by 5G NFs. The firewall rules must be updated as new services are added and as existing services are updated. Such updating is currently performed manually by the network operator, which is a labor-intensive and error prone operation. For example, when the Third Generation Partnership Project (3GPP) publishes a new standard or an update to an existing standard, the firewall rules must be updated to allow (or expressly block) the new message types corresponding to new or updated services defined by the standard. The problem is magnified in light of the number of services and the frequency of updates to the services.

Accordingly, there exists a need for improved methods, systems, and computer readable media for generating and updating firewall rules used to filter SBI messages in a core network.

SUMMARY

A method for automatically generating and distributing firewall rules to filter service-based interface (SBI) messages includes maintaining a repository of firewall rules for updating a ruleset used by a core network firewall to SBI messages transmitted in a core network. The method further includes automatically retrieving, from an online archive of Third Generation Partnership Project (3GPP) standards documents, definitions of service operations performed on SBI interfaces in the core network. The method further includes automatically generating firewall rules based on the definitions of the service operations. The method further includes storing the firewall rules in the repository of firewall rules. The method further includes automatically distributing the firewall rules in the repository of firewall rules to the core network firewall.

According to another aspect of the subject matter described herein, maintaining the repository of firewall rules includes maintaining the repository on a stand-alone network node dedicated to updating firewall rulesets.

According to another aspect of the subject matter described herein, maintaining the repository of firewall rules includes maintaining the repository on a network node comprising an element management system (EMS) used to configure 5G network functions.

According to another aspect of the subject matter described herein, generating the firewall rules includes reading the definitions of the service operations in YAML files published in the archive and extracting firewall rule criteria from the YAML files.

According to another aspect of the subject matter described herein, extracting the firewall rule criteria from the YAML files includes extracting SBI message attributes from the YAML files and using the SBI message attributes as the firewall rule criteria.

According to another aspect of the subject matter described herein, automatically retrieving the definitions of the service operations includes periodically checking the archive for new or updated definitions of the service operations.

According to another aspect of the subject matter described herein, automatically generating the firewall rules includes generating firewall rules to allow messages corresponding to new or updated service operations defined in the definitions of the service operations.

According to another aspect of the subject matter described herein, the core network firewall comprises a security edge protection proxy (SEPP) and automatically distributing the firewall rules includes automatically updating firewall rules used by the SEPP to filter ingress and egress inter-public land mobile network (PLMN) traffic.

According to another aspect of the subject matter described herein, the method for automatically generating and distributing firewall rules includes, at the SEPP, using the firewall rules to filter the ingress and egress inter-PLMN traffic.

According to another aspect of the subject matter described herein, the core network firewall comprises a 5G core network firewall separate from a security edge protection proxy (SEPP) and automatically distributing the firewall rules includes automatically updating the firewall rules used by the 5G core network firewall to filter the SBI messages.

According to another aspect of the subject matter described herein, a system for automatically generating and distributing firewall rules to filter service-based interface (SBI) messages is provided. The system includes a network node including at least one processor and a memory. The system includes a repository of firewall rules stored in the memory for updating a ruleset used by a core network firewall to filter SBI messages transmitted in a core network. The system further includes an automated firewall rules generator/distributor implemented by the at least one processor for automatically retrieving, from an online archive of Third Generation Partnership Project (3GPP) standards documents, definitions of service operations performed on SBI interfaces in the core network, automatically generating firewall rules based on the definitions of the service operations, storing the firewall rules in the repository of firewall rules, and automatically distributing the firewall rules in the repository of firewall rules to the core network firewall.

According to another aspect of the subject matter described herein, the network node comprises a stand-alone network node dedicated to updating firewall rules.

According to another aspect of the subject matter described herein, the network node comprises an element management system (EMS) used to configure 5G network functions.

According to another aspect of the subject matter described herein, in generating the firewall rules, the automated firewall rules generator/distributor is configured to read the definitions of the service operations in YAML files published in the archive and extracting firewall rule criteria from the YAML files.

According to another aspect of the subject matter described herein, in extracting the firewall rule criteria from the YAML files, the automated firewall rules generator/distributor is configured to extract SBI message attributes from the YAML files and use the SBI message attributes as the firewall rule criteria.

According to another aspect of the subject matter described herein, in automatically retrieving the definitions of the service operations, the automated firewall rules generator/distributor is configured to periodically check the archive for new or updated definitions of the service operations.

According to another aspect of the subject matter described herein, in automatically generating the firewall rules, the automated firewall rules generator/distributor is configured to generate firewall rules to allow messages corresponding to new or updated service operations defined in the definitions of the service operations.

According to another aspect of the subject matter described herein, the core network firewall comprises a security edge protection proxy (SEPP), and, in automatically distributing the firewall rules, the automated firewall rules generator/distributor is configured to automatically update firewall rules used by the SEPP to filter ingress and egress inter-public land mobile network (PLMN) traffic.

According to another aspect of the subject matter described herein, the core network firewall comprises a 5G core network firewall separate from a security edge protection proxy (SEPP), and, in automatically distributing the firewall rules, the automated firewall rules generator/distributor is configured to automatically update the firewall rules used by the 5G core network firewall to filter the SBI messages.

According to another aspect of the subject matter described herein, a non-transitory computer readable medium having stored thereon executable instructions that when executed by a processor of a computer control the computer to perform steps is provided. The steps include maintaining a repository of firewall rules for updating a ruleset used by a core network firewall to filter service-based interface (SBI) messages transmitted in a core network. The steps further include automatically retrieving, from an online archive of Third Generation Partnership Project (3GPP) standards documents, definitions of service operations performed on SBI interfaces in the core network. The steps further include automatically generating firewall rules based on the definitions of the service operations. The steps further include storing the firewall rules in the repository of firewall rules. The steps further include automatically distributing the firewall rules in the repository of firewall rules to the core network firewall.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
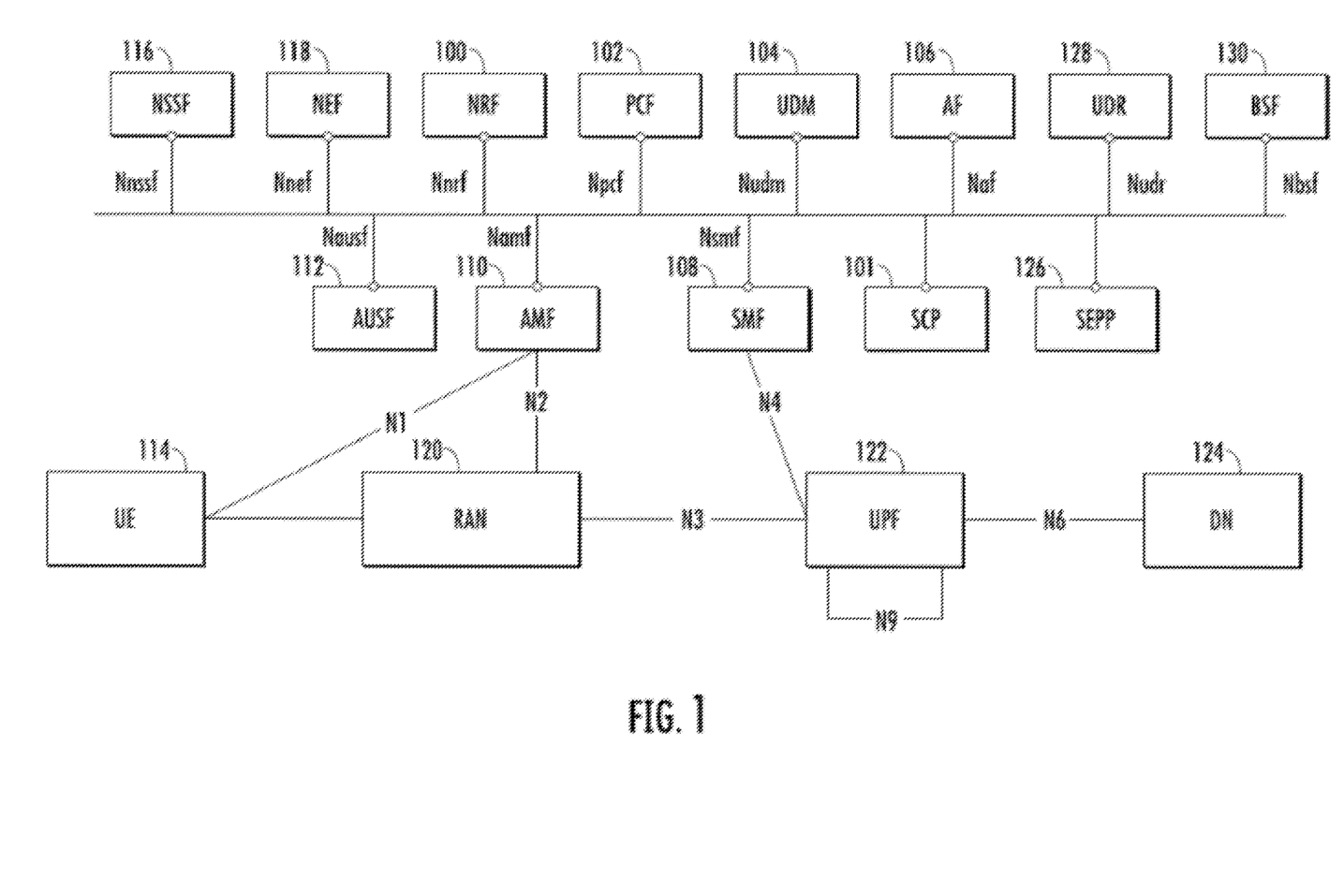
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

As described above, one problem with 5G and other types of networks is keeping 5G network firewall rules up to date as SBI services are updated and/or newly added to the network. The 5G architecture works on a microservices-based model. New services are being added by the day to the 3GPP specifications. New network functions are either added or existing network functions are decomposed to break down the functionality facilitate network operations. The updating and adding of network functions creates challenges for network operations in upgrading and enhancing the network firewall to filter traffic to and from the new or updated network functions. Network operators face these challenges because most network function vendors provide new and updated network functions via configurations, which means that when newer interfaces are added, a network operator is required to manually check and add the appropriate configurations at the firewall to support these new interfaces. These challenges are magnified at the SEPP, because updated firewall configurations must be implemented for both the ingress and egress directions.

Figure 2:
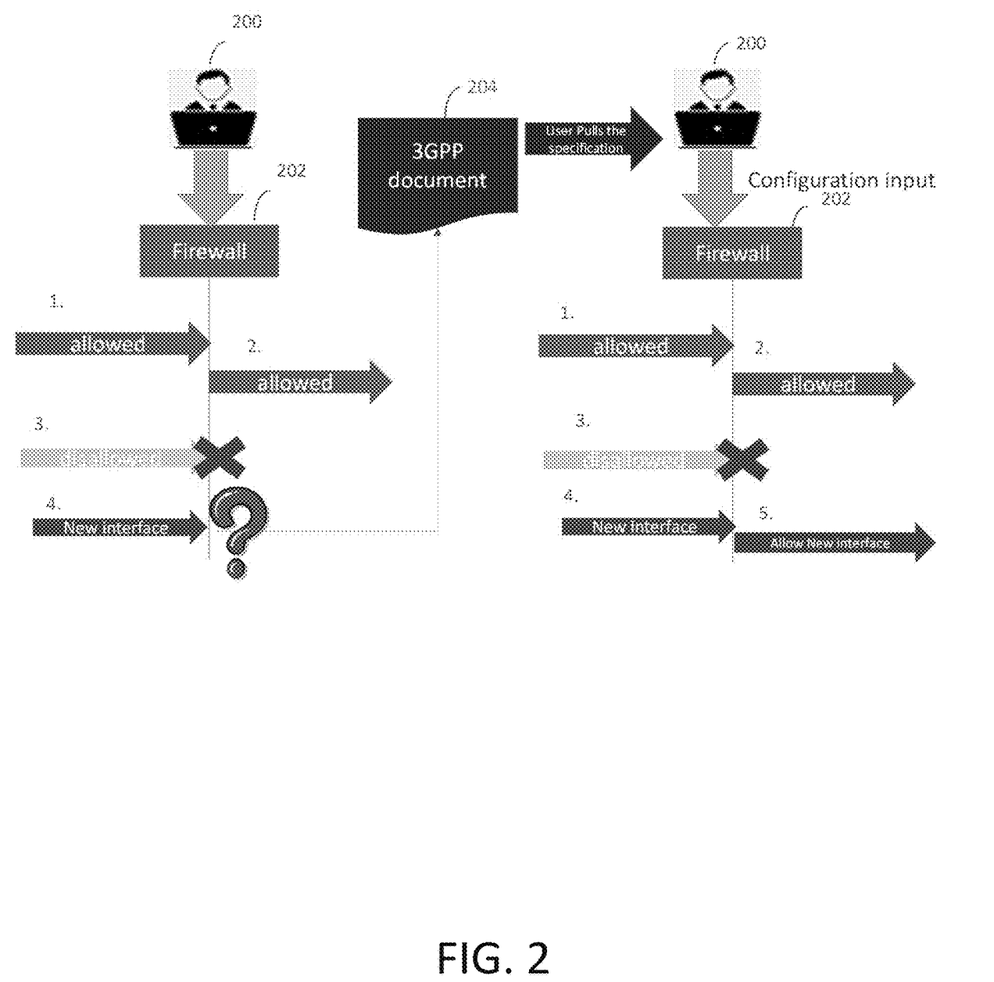
FIG. 2 is a network diagram illustrating manual configuration of rules for a 5G core network firewall.

FIG. 2 is a network diagram illustrating manual configuration of rules for a 5G core network firewall. Referring to FIG. 2, when a user 200 initially configures a core network firewall 202, the user configures rules according to existing interfaces defined in 3GPP standards documents. In line 1 of the message flow on the left hand side of FIG. 2, a message arrives at core network firewall 202. Core network firewall 202 compares attributes of the message with firewall rule criteria. In this example, the attributes of the message match the criteria associated with one of the firewall rules, and the action associated with the firewall rule is "allow". Accordingly, in line 2 of the message flow diagram on the left-hand side of FIG. 2, the message is allowed.

In line 3, firewall 202 receives another message. In this example, firewall 202 compares the attributes of the message with firewall rule criteria, locates a firewall rule with matching criteria, and the corresponding action is block. Accordingly, firewall 202 blocks the message.

In line 4 of the message flow diagram on the right hand side of FIG. 2, firewall 202 receives a message. In this example, the message is for a newly defined service in the 5G core network. Accordingly, it is unclear whether firewall 202 should block or allow the message. Since most firewalls are configured to block unknown messages by default, the message may be blocked. However, the message may be a legitimate message that should be allowed in the core network.

To allow firewall 202 to properly filter messages for newly defined interfaces, user 200, who may be the network operator, must manually configure firewall 202 with rules for newly defined services, as specified in 3GPP documents. In the message flow diagram on the right-hand side of FIG. 2, lines 1-3 are the same as those in lines 1-3 in the message flow diagram on the left hand side. In line 4, firewall 202 receives a message for the newly defined service or interface. Because user 200 has manually configured firewall 202 with a rule corresponding to the message for the new service or interface, firewall 202 locates a corresponding firewall rule for the message. In this example, the firewall rule specifies an action of allow. Accordingly, in line 5, firewall 202 allows the message relating to the new service or interface to pass into or out of the core network.

Manually configuring firewall 202 each time a new service or interface is added to the network or updated in the network is burdensome on network operators. To avoid or reduce this burden, the subject matter described herein includes automatically retrieving information regarding new 5G interfaces and/or service operations from an online archive of published 3GPP standards documents, generating firewall rules based on the interface and/or service operation definitions, storing the firewall rules in a repository of firewall rules, updating core network firewalls from the rules in the repository, and enforcing the newly installed rules at the network firewalls. In one example, the network firewall comprises a SEPP, and the information regarding new interfaces is published in OpenAPI format. The solution involves in providing a framework in which the SEPP is provided with automatically generated firewall rules based on the latest updates to interfaces/services based on the publishing of new service definitions in OpenAPI format in YAML files that accompany 3GPP industry standards documents when the documents are published. The framework involves retrieving these interface/service definitions published in OpenAPI format, deriving firewall rules from the interface/service definitions, updating the firewall rules used by the SEPP at a time configured by the network operator, and enforcing these rules automatically without the need for manual configuration.

Figure 3:
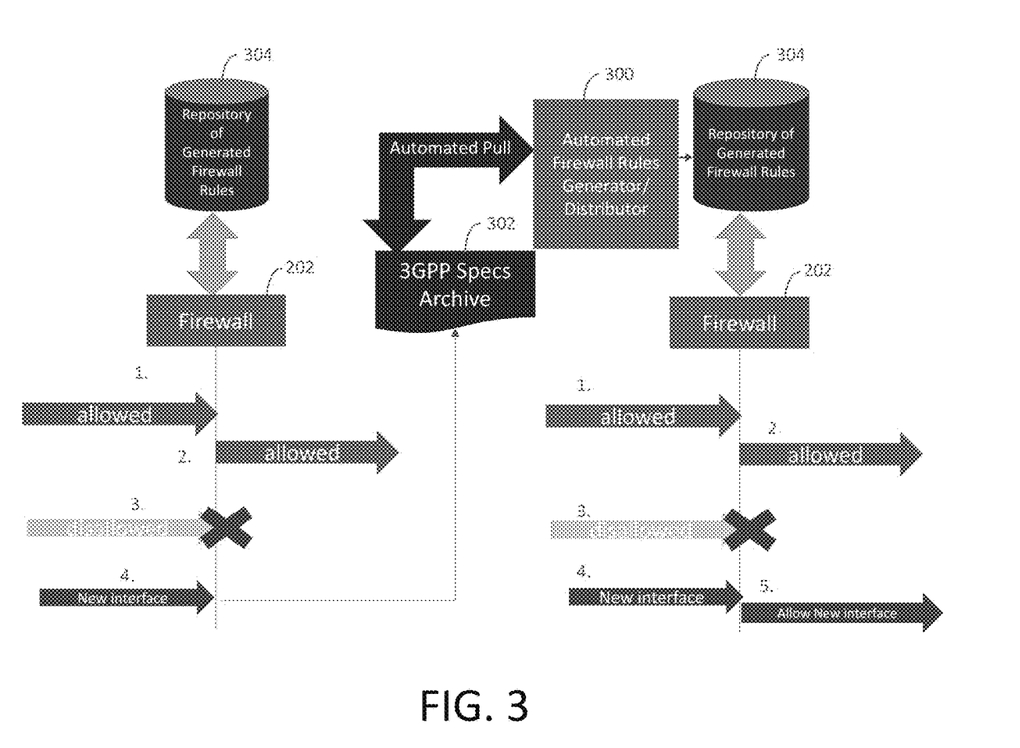
FIG. 3 is a network diagram illustrating automatic generation and configuration of rules for a 5G network firewall based on updates to an online archive of 3GPP standards documents.

FIG. 3 is a network diagram illustrating automatic generation and configuration of rules for a 5G network firewall based on updates to an online archive 3GPP standards documents. Referring to FIG. 3, an automated firewall rules generator/distributor 300 automatically pulls or retrieves service operation definitions for services provided on SBI interfaces from an online archive 302 of 3GPP standards documents, generates firewall rules based on the definitions, and stores the firewall rules in repository 304 of generated firewall rules. Automated firewall rules generator/distributor 300 also pushes firewall rule updates from repository 304 to firewalls 202 to update the firewall rule sets used by firewalls 202 as new firewall rules are generated.

The message flow on the left-hand side of FIG. 3 is intended to show operation of firewall 202 before the rules are updated. In line 1 of the message flow, firewall 202 receives an SBI message relating to a service provided on an SBI interface (such as any of the SBI interface types illustrated in FIG. 1), locates a corresponding firewall rule indicating that the message should be allowed, and, in line 2, allows the message into the network. In line 3, firewall 202 receives another SBI message relating to a service provided on the SBI interface, locates a corresponding firewall rule, and determines that the message should be disallowed or blocked. In line 4, firewall 202 receives an SBI message relating to a new service provided on the SBI interface before a corresponding firewall rule is created and may block the new message by default. However, as indicated by the message flow on the right-hand side of FIG. 3, once automated firewall rules generator/distributor 300 pulls the necessary interface definitions from archive 302, generates the corresponding firewall rules and updates firewall 202, the message relating to the new interface or service will be allowed to pass through the firewall, as indicated by lines 4 and 5.

Figure 4A:
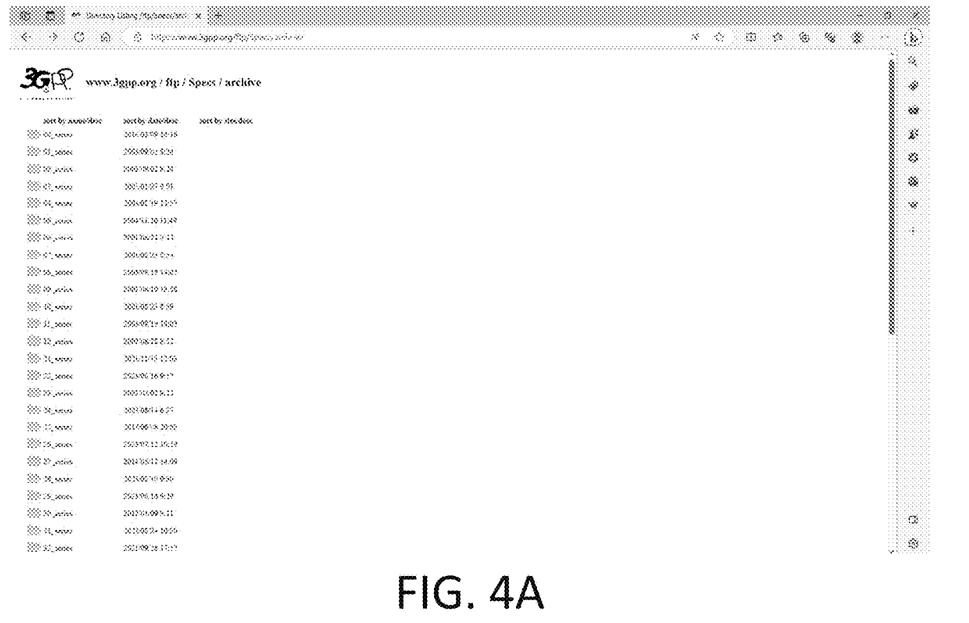
FIG. 4A is a computer screen shot of a file directory listing for an online archive of 3GPP industry standards documents.
Figure 4B:
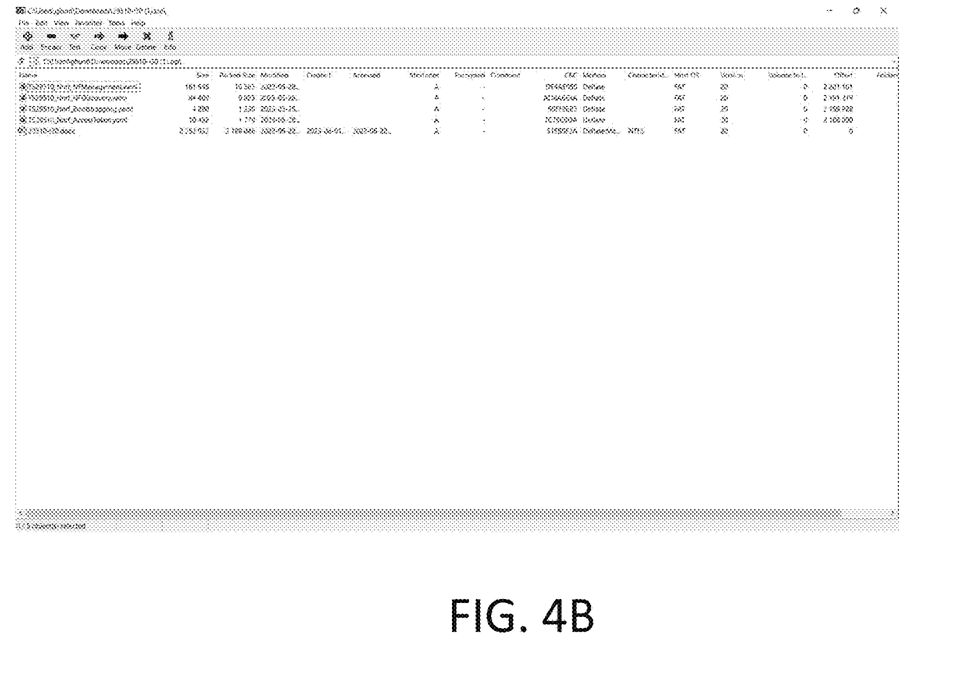
FIG. 4B is a computer screen shot of exemplary files that are published with the 3GPP TS 29.510 industry standards document.

As an example, 3GPP TS 29.510, which describes the service operations of an NRF, may be used by automated firewall rules generator/distributor 300 generating and updating firewall rules relating to services provided by the NRF. FIG. 4A is a computer screen shot of the archive page for the 3GPP archive for 3GPP specifications, which define the interfaces used to communicate in 5G networks and the services provided over the interfaces. The archive is accessible via file transfer protocol (FTP) at https/www.3gpp.org/ftp/Specs/archive/. FIG. 4B is a computer screen shot illustrating a listing of files available for 3GPP TS 29.510, which defines the interfaces and services of the NRF. As illustrated in FIG. 4B, for 3GPP TS 29.510, the online includes a Microsoft Word document that includes the text of the specification for the NRF and YAML files that define, in OpenAPI format, services of the NRF. These services are also referred to in 3GPP standards documents as service operations. The defined services include the Nnrf_NFDiscovery service, the Nnrf_Bootstrapping service, and the NnrfAccessToken service. The following is an example of a portion of the YAML file published with 3GPP TS 29.510 for the NFDiscovery service:

```
openapi: 3.0.0
info:
  version: '1. 3.0-alpha.4'
  title: 'NRF NFDiscovery Service'
  description:
    NRF NFDiscovery Service.
    © 2023, 3GPP Organizational Partners (ARIB, ATIS,
CCSA, ETSI, TSDSI, TTA, TTC).
    All rights reserved.
externalDocs:
  description: 3GPP TS 29.510 V18.3.0; 5G System;
Network Function Repository Services; Stage 3
  url:
'https://www.3gpp.org/ftp/Specs/archive/29_series/29.510
/'
servers:
  - url: '{apiRoot}/nnrf-disc/v1'
    variables:
    apiRoot:
      default: https://example.com
      description: apiRoot as defined in clause 4.4 of
3GPP TS 29.501
```

Automated firewall rules generator/distributor 300 may automatically generate the firewall rule shown below in Table 1 based on the information in the YAML file published with the 3GPP TS 29.510 specification:

TABLE 1

Firewall Rule for NFDiscover Service Operation Generated from YAML File

| Firewall Rule Criteria | Firewall Rule Action |
| --- | --- |
| nnrf-disc | ALLOW |

In the example in Table 1, the automatically generated firewall rule criteria include "nnrf-disc", which is obtained from the YAML file as part of the URL used to access the NF discovery service provided by the NRF. This URL would appear in NF discovery request messages used to request the NF discovery service from the NRF and thus should be allowed by the firewall as a legitimate message type in the network. The firewall rule criteria may be further enhanced using additional information from the YAML file. For example, for NFDiscover service operation queries, the type of message (query or response) may be extracted from the following portion of the YAML file:

```
name: requester-nf-type
in: query
description: Type of the requester NF
required: true
schema:
$ref:
'TS29510_Nnrf_NFManagement.yaml#/components/schemas/NFType'
```

TABLE 2

Updated Firewall Rule for NFDiscover Service Operation Query Generated from YAML File

| Firewall Rule Criteria | | |
|---|---|---|
| URL | Message type | Firewall Rule Action |
| {apiRoot}/nnrf-disc/v1 | Query | ALLOW |

In Table 2, the automatically generated firewall rule has been enhanced to include the full URL of the NRF and type of message as firewall criteria. These criteria can be used to identify an NF discovery request message. It should be noted that the parameters in Tables 1 and 2 used to automatically generate firewall rules are shown for illustrative purposes only and parameters other than or in addition to those shown from the YAML files may be used to automatically generate a firewall rule. Automated firewall rules generator/distributor 300 may generate and distribute firewall rules based on newly defined interfaces or services for any of the SBI interfaces illustrated in FIG. 1 and also for newly defined services or interfaces that are not illustrated in FIG. 1.

Figure 5:
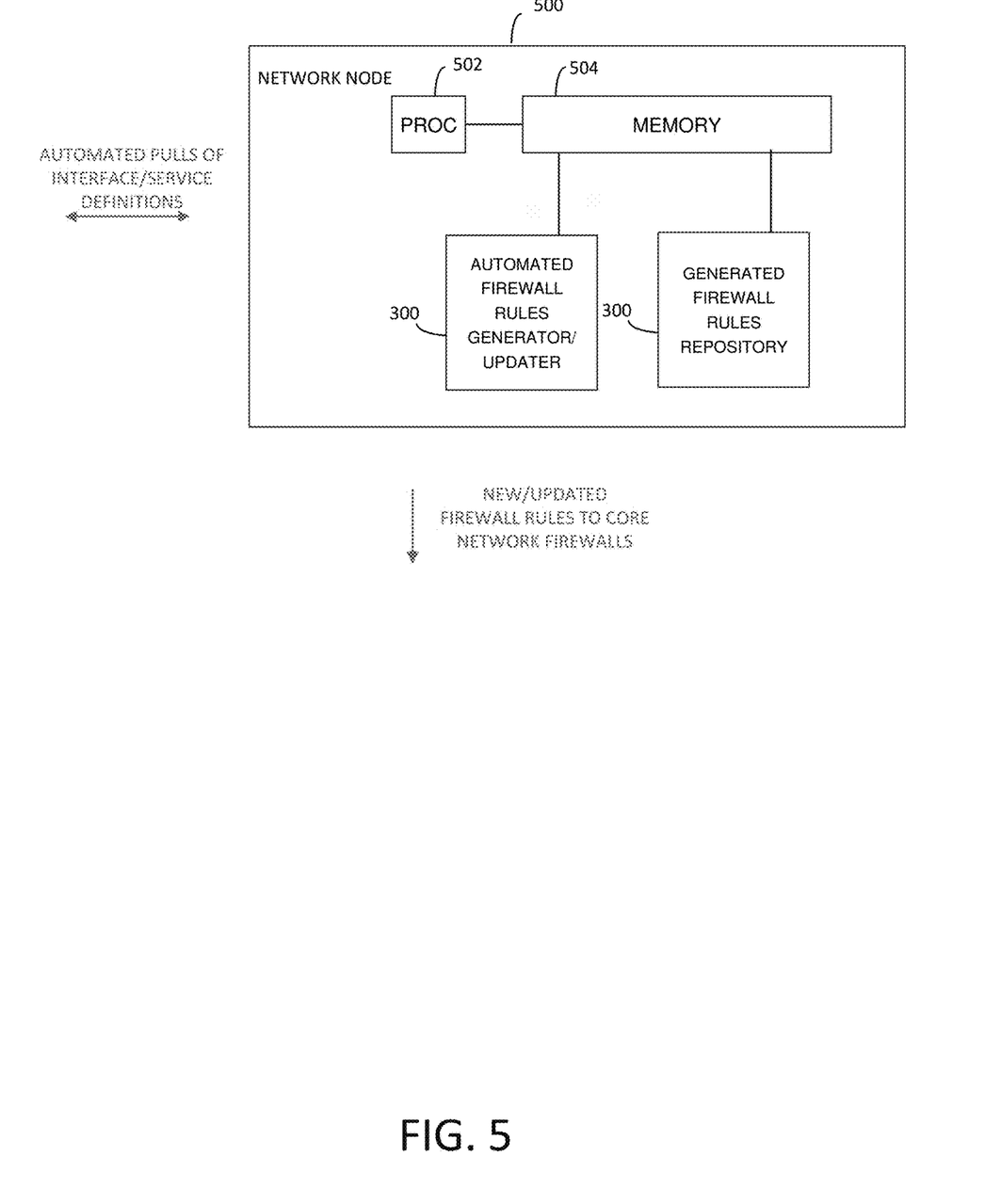
FIG. 5 is a block diagram illustrating an exemplary architecture of a system for automatically generating and updating rules for a 5G core network firewall based on updates to an online archive of 3GPP standards documents.

FIG. 5 is a block diagram illustrating an exemplary architecture of a system for automatically generating and distributing rules for a 5G core network firewall based on updates to an online archive of 3GPP standards documents. Referring to FIG. 5, a network node 500 includes at least one processor 502 and a memory 504. Automated firewall rules generator/distributor 300 may reside on network node 500 and be implemented using computer executable instructions stored in memory 504 and executable by processor 502. In one example, network node 500 may be a standalone node dedicated to generating and updating network firewall rules. In another example, network node 500 may be an element management system (EMS) configured to update network firewalls with newly generated firewall rules using APIs provided by the network firewalls. Automated firewall rules generator/distributor 300 may automatically pull interface/service definitions from the archive of 3GPP standards documents, generate corresponding firewall rules, and store the generated firewall rules in generated firewall rules repository 304. Automated firewall rules generator/distributor 300 may also distribute the generated firewall rules to any core network firewalls, such as SEPPs and non-SEPP core network firewalls. The core network firewalls may utilize the newly configured firewall rules to filter ingress traffic and egress traffic in the core network. The core network firewalls that receive and use the automatically generated firewall rules may each be any NF that is capable of functioning as a firewall, including a SEPP, an SCP, or other NF that can implement firewall filtering.

Figure 6:
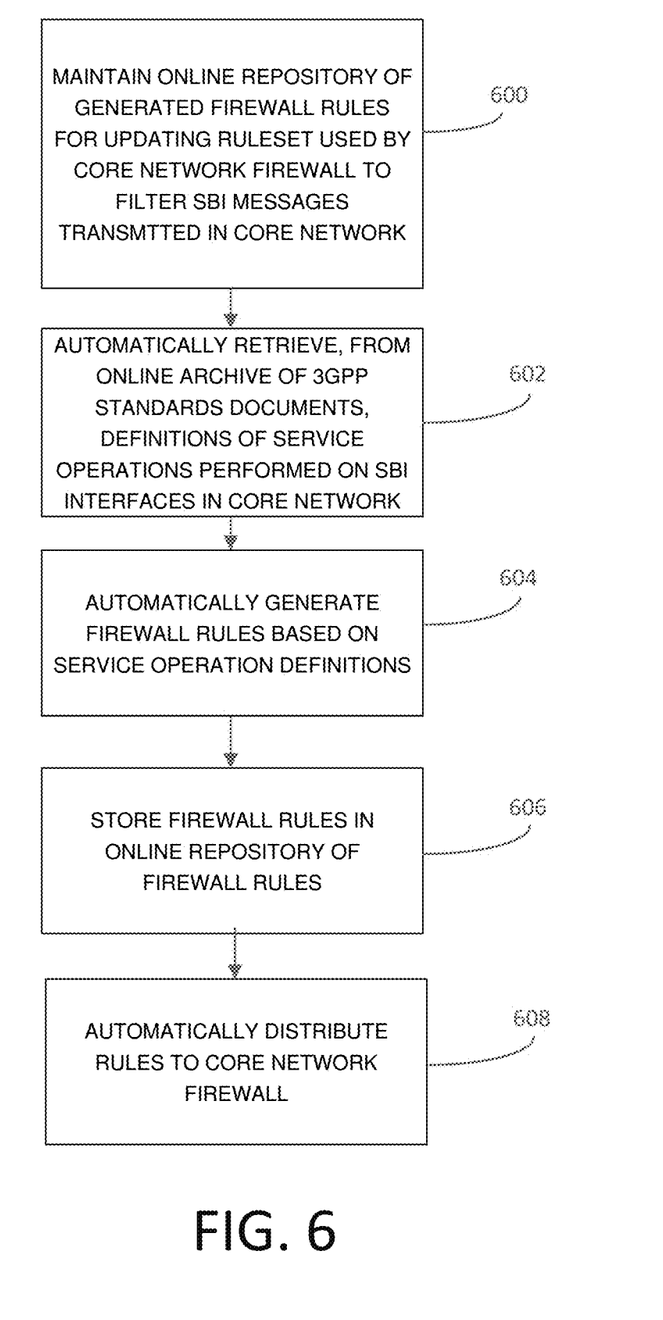
FIG. 6 is a flow chart illustrating an exemplary process for automatically generating and updating rules for a 5G core network firewall based on updates to an online archive of 3GPP standards documents.

FIG. 6 is a flow chart illustrating an exemplary process for automatically generating and updating firewall rules for a 5G core network firewall based on updates to an archive of 3GPP standards documents. Referring to FIG. 6, in step 600, the process includes maintaining a repository of firewall rules for updating a ruleset used by a core network firewall to filter service-based interface (SBI) messages transmitted in a core network. For example, automated firewall rules generator/distributor 300 may maintain repository 304 of auto-generated firewall rules, which may be used to update the firewall rulesets used by core network firewalls, such as SEPPs or any other network firewall that filters messages in a 5G or subsequent generation core network.

In step 602, the process includes automatically retrieving, from an online archive of Third Generation Partnership Project (3GPP) standards documents, definitions of service operations performed on SBI interfaces in the core network. For example, automated firewall rules generator/distributor 300 may monitor the online archive of 3GPP standards documents and associated YAML files for new service operation definitions or updated service operation definitions on SBI interfaces. Such monitoring may include periodically accessing the FTP or HTTP server that maintains the 3GPP online archive and comparing the file directory listing to a file directory listing previously accessed by automated firewall rules generator/distributor 300. If automated firewall rules generator/distributor 300 detects that the current file directory listing includes new files that were not present in the previously retrieved fie directory listing, automated firewall rules generator/distributor 300 may retrieve the newly posted files.

In step 604, the process includes automatically generating firewall rules based on the service operation definitions. For example, automated firewall rules generator/distributor 300 may read YAML files, the text of the standards documents themselves, or any other files published by 3GPP in the online archive and extract message parameters associated with service operations defined for SBI interfaces. Examples of such parameters for the NFDiscover service operation are described above. Automated firewall rules generator/distributor 300 may include selected ones of the parameters as firewall rule criteria and set a corresponding action for the rule. For example, if the parameters indicate a new message type that should be allowed in the core network and firewall 202 has a default rule indicating that messages not matching of the more specific rules should be blocked, automated firewall rules generator/distributor 300 may set the action for the newly created firewall rule to allow the new message type.

In step 606, the process includes storing the firewall rules in the repository of firewall rules. For example, automated firewall rules generator/distributor 300 may store the generated firewall rules in repository 304.

In step 608, the process includes automatically distributing the firewall rules in the repository of firewall rules to the core network firewall. For example, automated firewall rules generator/distributor 300 may distribute firewall rules from repository 304 to core network firewalls, including SEPPs and non-SEPP e network firewalls. Automated firewall rules generator/distributor 300 may distribute the firewall rules using APIs used to configure the network firewalls. In one example, automated firewall rules generator/distributor 300 may be implemented on an EMS that uses RESTful interfaces to update the rulesets used by the network firewalls.

By supporting automated generation of firewall rules and automated updating of rulesets used by network firewalls, the subject matter described herein reduces the time and labor required to keep network firewall rules up to date with changes in industry standards. The firewall rules generated using the methodology described herein can be used to implement both stateless and stateful security countermeasures. A stateless security countermeasure is security countermeasure based on a received message without regard to other messages or events in the network. A stateful security countermeasure is a security countermeasure that depends on the current messages and other messages or the current state of the network.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.3.0 (2023-06)
2. 5G Interconnect Security; GSMA FS.36; Version 2.0 (3 Jun. 2021)
3. 3$^{rd}$ Generation Partnership Project; Technical Specification Group Core Network and Terminals; 5G System; Technical Realization of Service Based architecture; Stage 3 (Release 18) 3GPP TS 29.500 V18.2.0 (2023-06)
4. 3$^{rd}$ Generation Partnership Project; Technical Specification Group Core Network and Terminals; 5G System; Principles and Guidelines for Services Definition; Stage 3 (Release 18) 3GPP TS 29.501 V18.2.0 (2023-06)
5. 3$^{rd}$ Generation Partnership Project; Technical Specification Group Services and System Aspects; Security Architecture and Procedures for the 5G System (Release 18) 3GPP TS 33.501 V18.2.0 (2023-06)
6. YAML, https://en.wikipedia.org/wiki/YAML; last updated Jul. 31, 2023

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically generating and distributing firewall rules to filter service-based interface (SBI) message relating to new or updated services, the method comprising:
maintaining a repository of firewall rules for updating a ruleset used by a core network firewall to filter service-based interface (SBI) messages transmitted in a core network;
automatically retrieving, from an online archive of Third Generation Partnership Project (3GPP) standards documents, definitions of service operations performed on SBI interfaces in the core network;
automatically generating firewall rules based on the definitions of the service operations;
storing the firewall rules in the repository of firewall rules; and
automatically distributing the firewall rules in the repository of firewall rules to the core network firewall.

2. The method of claim 1 wherein maintaining the repository of firewall rules includes maintaining the repository on a stand-alone network node dedicated to updating firewall rulesets.

3. The method of claim 1 wherein maintaining the repository of firewall rules includes maintaining the repository on a network node comprising an element management system (EMS) used to configure 5G network functions.

4. The method of claim 1 wherein automatically generating the firewall rules includes reading the definitions of the service operations in YAML files published in the archive and extracting firewall rule criteria from the YAML files.

5. The method of claim 4 wherein extracting the firewall rule criteria from the YAML files includes extracting SBI message attributes from the YAML files and using the SBI message attributes as the firewall rule criteria.

6. The method of claim 1 wherein automatically retrieving the definitions of the service operations includes periodically checking the archive for new or updated definitions of the service operations.

7. The method of claim 1 wherein automatically generating the firewall rules includes generating firewall rules to allow messages corresponding to new or updated service operations defined in the definitions of the service operations.

8. The method of claim 1 wherein the core network firewall comprises a security edge protection proxy (SEPP) and wherein automatically distributing the firewall rules includes automatically updating firewall rules used by the SEPP to filter ingress and egress inter-public land mobile network (PLMN) traffic.

9. The method of claim 8 comprising, at the SEPP, using the firewall rules to filter the ingress and egress inter-PLMN traffic.

10. The method of claim 1 wherein the core network firewall comprises a 5G core network firewall separate from a security edge protection proxy (SEPP) and wherein automatically distributing the firewall rules includes automatically updating the firewall rules used by the 5G core network firewall to filter the SBI messages.

11. A system for automatically generating and distributing firewall rules to filter service-based interface (SBI) message relating to new or updated services, the system comprising:
a network node including at least one processor and a memory;
a repository of firewall rules stored in the memory for updating a ruleset used by a core network firewall to filter service-based interface (SBI) messages transmitted in a core network; and
an automated firewall rules generator/distributor implemented by the at least one processor for automatically retrieving, from an online archive of Third Generation Partnership Project (3GPP) standards documents, definitions of service operations performed on SBI interfaces in the core network, automatically generating firewall rules based on the definitions of the service operations, storing the firewall rules in the repository of firewall rules, and automatically distributing the firewall rules in the repository of firewall rules to the core network firewall.

12. The system of claim 11 wherein the network node comprises a stand-alone network node dedicated to updating firewall rules.

13. The system of claim 11 wherein the network node comprises an element management system (EMS) used to configure 5G network functions.

14. The system of claim 11 wherein, in generating the firewall rules, the automated firewall rules generator/distributor is configured to read the definitions of the service operations in YAML files published in the archive and extracting firewall rule criteria from the YAML files.

15. The system of claim 14 wherein, in extracting the firewall rule criteria from the YAML files, the automated firewall rules generator/distributor is configured to extract SBI message attributes from the YAML files and use the SBI message attributes as the firewall rule criteria.

16. The system of claim 11 wherein, in automatically retrieving the definitions of the service operations, the automated firewall rules generator/distributor is configured to periodically check the archive for new or updated definitions of the service operations.

17. The system of claim 11 wherein, in automatically generating the firewall rules, the automated firewall rules generator/distributor is configured to generate firewall rules to allow messages corresponding to new or updated service operations defined in the definitions of the service operations.

18. The system of claim 11 wherein the core network firewall comprises a security edge protection proxy (SEPP) and wherein, in automatically distributing the firewall rules, the automated firewall rules generator/distributor is configured to automatically update firewall rules used by the SEPP to filter ingress and egress inter-public land mobile network (PLMN) traffic.

19. The system of claim 11 wherein the core network firewall comprises a 5G core network firewall separate from a security edge protection proxy (SEPP) and, in automatically distributing the firewall rules, the automated firewall rules generator/distributor is configured to automatically update the firewall rules used by the 5G core network firewall to filter the SBI messages.

20. A non-transitory computer readable medium having stored thereon executable instructions that when executed by a processor of a computer control the computer to perform steps comprising:
   maintaining a repository of firewall rules for updating a ruleset used by a core network firewall to filter service-based interface (SBI) messages transmitted in a core network;
   automatically retrieving, from an online archive of Third Generation Partnership Project (3GPP) standards documents, definitions of service operations performed on SBI interfaces in the core network;
   automatically generating firewall rules based on the definitions of the service operations;
   storing the firewall rules in the repository of firewall rules; and
   automatically distributing the firewall rules in the repository of firewall rules to the core network firewall.

* * * * *